United States Patent

Bylsma

[11] Patent Number: 5,911,206
[45] Date of Patent: Jun. 15, 1999

[54] FUEL INJECTION UPDATE SYSTEM

[75] Inventor: Philip J. Bylsma, Brookfield, Wis.

[73] Assignee: Outboard Marine Corporation, Waukegan, Ill.

[21] Appl. No.: 08/902,859

[22] Filed: Jul. 30, 1997

[51] Int. Cl.$^6$ .................................................. F02B 17/00
[52] U.S. Cl. ......................... 123/295; 123/305; 123/480
[58] Field of Search .................................... 123/295, 305, 123/430, 478, 480

[56] References Cited

U.S. PATENT DOCUMENTS

| | | | |
|---|---|---|---|
| 4,825,369 | 4/1989 | Oshizawa | 701/105 |
| 5,078,107 | 1/1992 | Morikawa | 123/305 X |
| 5,297,064 | 3/1994 | Bauerle | 702/98 |
| 5,722,362 | 3/1998 | Takano et al. | 123/295 |
| 5,755,198 | 5/1998 | Grob et al. | 123/295 |

*Primary Examiner*—Tony M. Argenbright
*Attorney, Agent, or Firm*—Jones, Day, Reavis & Pogue

[57] ABSTRACT

A fuel-injection system for an internal combustion engine that operates in a stratified mode of fuel injection during a first engine speed range and a homogeneous mode of fuel injection during a second engine speed greater than the first range. A changeover speed is determined for a particular engine and, upon speed (or load) increasing to the point of changeover from the stratified mode, the engine speed update point changes from a first or "standard" update point to a second predetermined "provisional" update point for one or two revolutions after which the update point then reverts back to the "standard" update point.

12 Claims, 6 Drawing Sheets

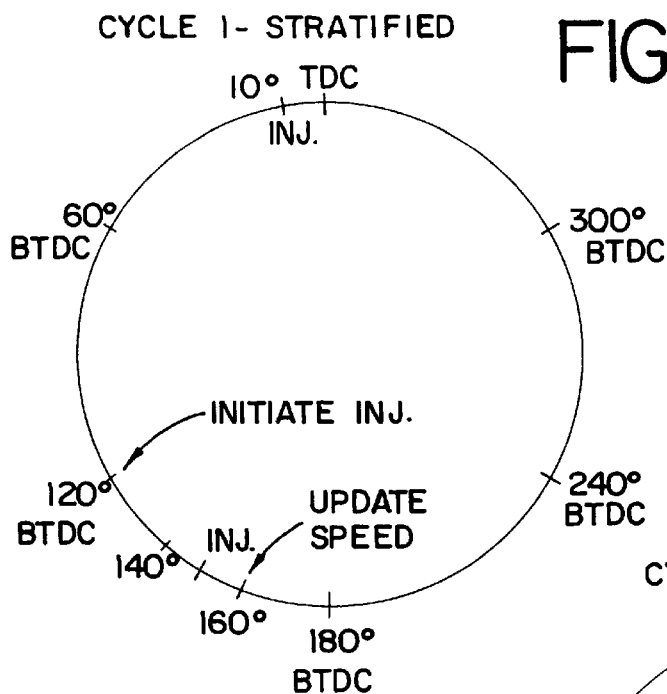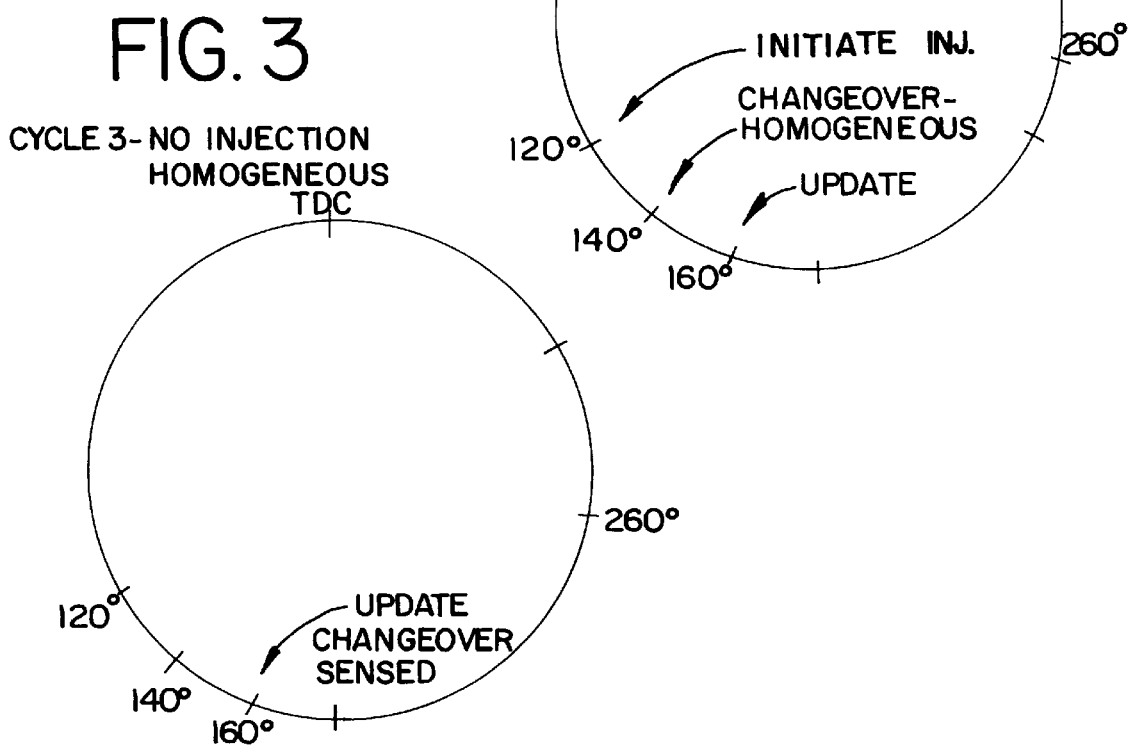

FUEL INJECTION UPDATE SYSTEM

BACKGROUND OF THE INVENTION

1. Field of the Invention

The present invention relates to direct fuel injection in internal combustion engines generally and in particular relates to a system for more accurately determining when fuel injection should occur when there is a rapid acceleration that causes engine operation to change from a stratified fuel-injection operation to a homogeneous fuel-injection operation thereby causing the point of desired fuel injection onset to significantly advance.

2. Description of Related Art including information Disclosed Under 37 CFR 1.97 and 1.98

In each cylinder of a direct-injected internal combustion engine, the timing of the injection event relative to crank-angle position varies with engine speed and/or throttle position (load). It is desirable to operate direct-injected engines in a highly stratified mode during idle and low engine speeds and/or loads and to change over at some speed and/or load condition to running in a highly homogenous mode as set forth in commonly assigned copending patent application Ser. No. PCT/U.S. 97/10636 filed Jun. 20, 1997 and entitled "Improved Time Delay Ignition Circuit for an Internal Combustion Engine", which application is incorporated herein by reference in its entirety. In the current design of direct-injected engines, the spark timing remains relatively constant with the spark occurring at a selected crankshaft angle just prior to top-dead-center (TDC). When the engine is running in a stratified mode, the fuel-injection event is based on a well-known two-dimensional map or look-up table that plots speed and/or load versus crankshaft angle. As speed or load increases, the earlier the fuel injection occurs before top-dead-center. It is based on a variable crankshaft-angle position, and is defined herein as the "stratified mode" fuel-injection operation and the fuel injection occurs a short "time" (crankshaft angle) prior to the spark, i.e., the injection occurs in a crankshaft-angle range near top-dead-center. As speed and/or load increases, the injection event is gradually advanced further prior to top-dead-center based on this two-dimensional map or look-up table. At some selective crankshaft angle, upon attainment of a sufficiently high speed and/or load, it is well known that there is a changeover from this "stratified mode" fuel injection onset to the "homogeneous mode" fuel-injection operation. It includes a smaller variable range of crank-angle-based determination of the onset of the injection event. That range may include the 40° immediately preceding bottom-dead-center and, again, a two-dimensional map, well known in the art, is used by the ECU to determine the exact crank angle position. At that point there is a significant instantaneous jump in the advance (movement further prior to top-dead-center) of the fuel-injection event. Thus the "homogeneous mode" of fuel injection is defined herein as engine operation after "changeover" occurs.

A frequent update of an engine operating condition such as speed and/or load condition is necessary to determine the proper fuel injection timing proper crankshaft angle) for each revolution. It is also desirable for optimal running quality that the update occur very closely (just prior) to the injection event so that the speed and/or load determination at the time of the update most closely approximates the actual speed and/or load at the time of the injection event. It would be apparent then that one would provide for such updates at some predetermined, regularly recurring crank angle. However, whereas this strategy is acceptable for conventional internal combustion engines in which the advance in the fuel injection is limited to some selective range of crank angles, in engines currently in production, where there can be a significant jump in the advancement of the crank angle at which fuel injection occurs, and in which the onset of the injection event may be at any crank angle, the single update position strategy fails. More specifically, utilizing a single constant update crank angle with such engines may result in the missing or skipping of an injection event when there is a changeover to the "homogeneous mode" fuel injection from the "stratified mode" determination of the onset of the fuel-injection event.

SUMMARY OF THE INVENTION

The present invention overcomes the problem of the prior art by devising a novel speed and/or load condition update strategy pursuant to which a second "transitional" update point is utilized during changeover from the stratified mode fuel-injection operation to the homogeneous mode fuel-injection onset. A two-dimensional map based on an engine operating condition such as speed and/or load is utilized to determine the aforementioned changeover point in a well-known fashion. When, and only when, speed and/or load increases to the point of changeover from the stratified mode injection onset, the update point based on the homogeneous mode is changed from the "standard" update point to a predetermined "provisional" crankshaft angle update point, which is far from the standard update point and closer to TDC, for at least one revolution of the engine, after which the update point then reverts back to the "standard" update point. As stated earlier, both speed (RPM) and/or load (throttle position) can be used to determine the "changeover" point. However, for simplicity of explanation, only speed (RPM) will be used in the examples.

Thus, the present invention relates to a fuel-injection system that updates an engine operating condition such as RPM at a first crankshaft angle and causes the fuel injection to each cylinder to be in the stratified mode during engine RPM in a first range and causes an update of the engine RPM at a second crankshaft angle closer to top-dead-center than the first crankshaft angle and then causes the fuel injection into each cylinder to be based on the homogeneous mode at a second engine speed greater than the first engine speed range.

It is an object of the present invention to cause a changeover from the "stratified mode" fuel injection related to a first crankshaft angle update position before TDC to the homogeneous mode fuel injection related to a second crankshaft angle update position closer to TDC than said first crankshaft angle update position when, and only when, there is a change in engine speed such that a second engine speed is equal to or greater than a first engine speed range in which the stratified mode fuel injection occurs.

Thus, the present invention relates to a fuel injection control system for an internal combustion engine having a crankshaft, a plurality of spark plugs, each for an engine cylinder, and a fuel injector for injecting fuel in each of the cylinders, the control system comprising a first circuit for updating an engine operating condition (RPM and/or load) at a first crankshaft angle and causing the fuel injection into each cylinder to be in a stratified mode in a first range of the engine operating condition (RPM and/or load), a second circuit for causing the fuel injection into each cylinder to be in a homogeneous mode during a second range of the engine operating condition (RPM and/or load) greater than the first range of the engine operating condition and a third circuit for updating the engine operating condition (RPM and/or load) at a second crankshaft angle closer to top-dead-center than the first crankshaft angle and for causing a changeover from the stratified mode of fuel injection to the homogeneous mode of fuel injection when, and only when, the second engine operating condition is greater than the first range of the engine operating condition.

BRIEF DESCRIPTION OF THE DRAWINGS

These and other features of the present invention will be more fully disclosed when taken in conjunction with the following DETAILED DESCRIPTION OF THE PREFERRED EMBODIMENT(S) in which like numerals represent like elements and in which:

FIGS. 1–9 illustrate crankshaft angle positions used for determining proper fuel injection and the problems created thereby and illustrating the solution to the problems with the present invention;

DETAILED DESCRIPTION OF THE PREFERRED EMBODIMENT(S)

As stated previously, it is desirable to operate direct fuel-injected engines in the highly stratified mode during idle and low engine speeds or loads and to change over at some speed and/or load condition to running or operating the engine in a highly homogeneous mode. Consider FIG. 1. Suppose the engine was designed to update speed and/or engine load data each time the crankshaft was at 160° before top-dead-center (BTDC). FIG. 1 illustrates this situation for cylinder #1. Suppose further that during the stratified fuel injection mode (i.e., idle and low engine speeds up to the changeover point) the fuel injection onset advances from 10° BTDC to 150° BTDC. During the stratified mode, the single, set update point would work fine, with updates occurring just prior to the range within which the fuel injection event may be initiated. Thus in FIG. 1, the RPM is updated at 160° BTDC and tells the microprocessor in the electronic control unit to initiate fuel injection at 120° BTDC.

However, suppose, as shown in FIG. 2, there is a rapid acceleration which causes changeover from the stratified mode to the homogeneous mode when the crankshaft is at, say, 140° BTDC, and the desired fuel injection onset jumps in advancement from, say, 120° BTDC to, say, 260° BIDC (which is quite a realistic possibility with new engines). When this situation occurs, the following happens: the load and/or speed is/are updated at 160° BTDC as shown in FIG. 2 and the circuit is instructed to initiate fuel injection at 120° BTDC. However, the rapid change in speed occurs at 140° BTDC. Thus, the new speed or changeover is not sensed until again reaching 160° BTDC as shown in FIG. 3.

Therefore, even though the engine, according to FIG. 2, should skip the fuel injection at 120° BTDC and inject at 260° BTDC instead (because of the speed and/or load condition at 140° BTDC is in the homogeneous/crankshaft-angle-based range with the increase in speed), since the engine has not been updated between 160° BTDC and 120° BTDC, the injection still occurs at 120° BTDC during this cycle of operation as shown in FIG. 2.

Figure 4:
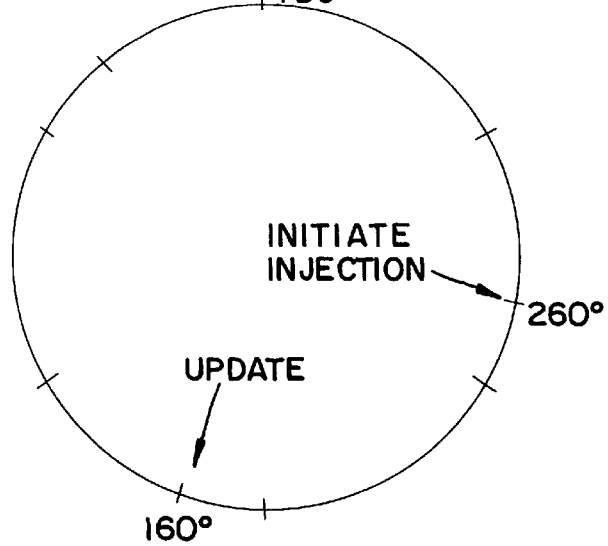

Upon passing top-dead-center and then again reaching the 160° BTDC update point, the engine now, as shown in FIG. 3, updates the changeover to the homogeneous mode crankshaft-angle-based injection at 260° BTDC. Therefore, in this cycle as shown in FIG. 3 there is no injection at 120° BTDC but, rather, injection initiates at 260° BTDC as shown in FIG. 4. Accordingly, with a single, set-update point, there is no injection event for 580° of revolution, which is unacceptable (any scheme or strategy under which there may be no injection event for 360° is unacceptable). That is, from the injection at 120° BTDC in FIG. 2, past TDC, back to 160° BTDC as shown in FIG. 3 whereat the engine RPM is updated, past 120° BTDC shown in FIG. 3 wherein injection is now skipped due to the latest update, past TDC again and finally injection occurs at 260° BTDC as shown in FIG. 4.

To overcome this problem, the present invention provides a novel update strategy pursuant to which a second "transitional" update point is utilized during changeover from stratified-mode-crankshaft-angle-based fuel injection onset to the homogeneous crankshaft-angle-based fuel injection onset. A two-dimensional map based upon speed and/or load versus crankshaft-angle-position (and well known in the art) is utilized by the engine control unit (ECU) to determine the aforementioned changeover point. Upon, and only upon, speed and/or load increasing to the point of changeover from a stratified-mode-crankshaft-angle-based injection onset, the update point changes from a first or "standard" update point to a second predetermined "provisional" or "transitional" update point, which is far from the first or standard update point, for one or two revolutions, after which the update point then reverts back to the "standard" update point.

Figure 5:
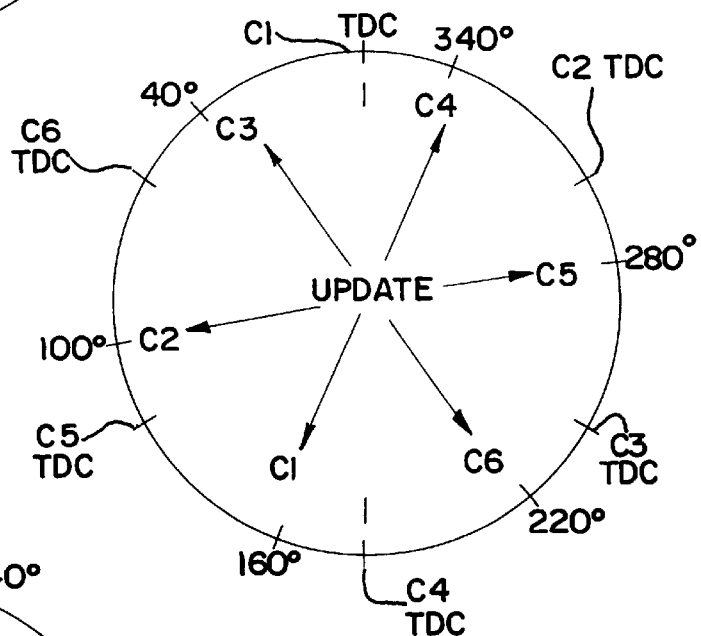

FIG. 5 represents one crankshaft revolution under stratified (low load/speed) conditions. Cylinder 1 (C1) has its top-dead-center at 0°, C2 has its top-dead-center at 60°, and so forth. The time of fuel injection for cylinder C1 is updated at 160° BTDC as shown in FIG. 5. Cylinder C2 is updated at 100° BTDC, C3 is updated at 40° BTDC, and so forth.

Figure 6:
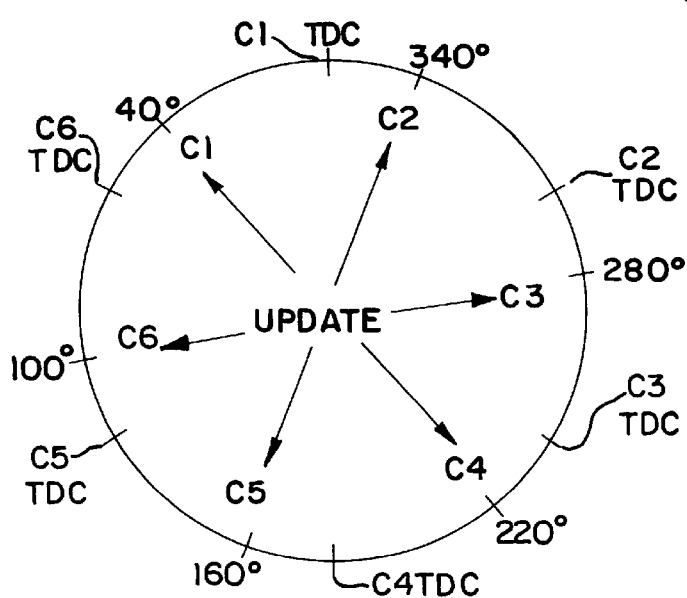

FIG. 6 represents one crankshaft revolution during changeover when the update points are moved. Specifically, during changeover, the C1 update jumps from 160° to 40° BTDC, C2 update jumps from 100° to 340° BTDC, C3 update jumps from 40° to 280° BTDC, and so forth.

Figure 7:
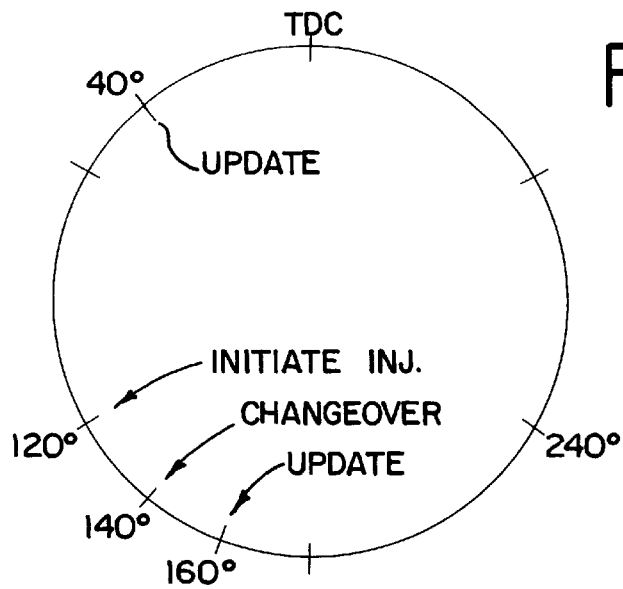
Figure 8:
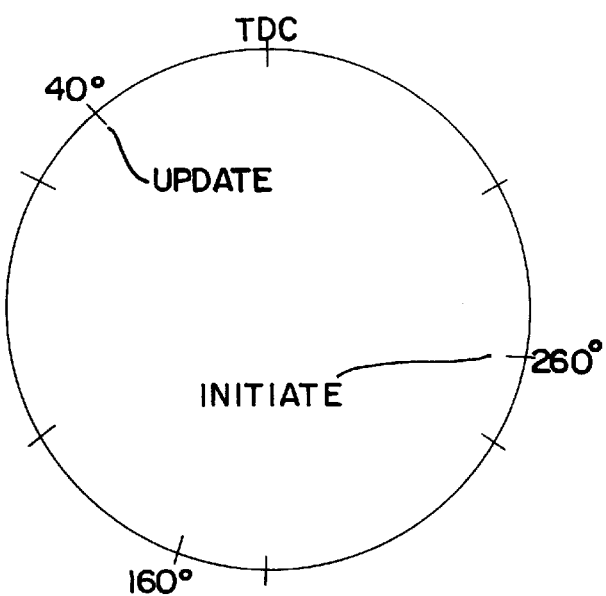
Figure 9:
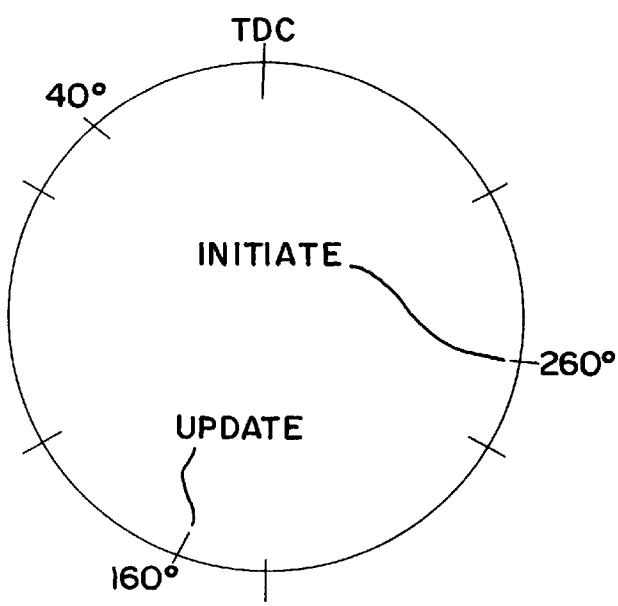

FIGS. 7–9 illustrate the operation of cylinder 1 (C1) during changeover. Up until changeover, the cycle is the same as that under stratified conditions as shown in FIG. 1. However, in the changeover cycle, as shown in FIG. 7, the update occurs at 160° BTDC causing initiation of injection at 120° BTDC. Changeover occurs at 140° BTDC (the rapid increase in engine speed or load is detected) and the update point for cylinder 1 is shifted to 40° BTDC as shown in FIG. 7. Thus cylinder C1 is updated twice in FIG. 7. At the second update (40° BTDC), because the engine has changed to its homogeneous mode, injection is initiated at 260° BTDC as shown in FIG. 8. As shown in FIG. 9, the engine switches back to the original update points (although still in the homogeneous mode) so that cylinder C1 is updated at 160° BTDC (with injection now being initiated at 260° BTDC as long as the engine remains in the homogeneous mode).

In addition to preventing the occurrence of no pulse in a revolution, it is important to prevent double pulses from occurring during a single revolution and to increase the accuracy of the update information.

One solution to these problems is to provide multiple update points. However, this is very expensive. In accordance with the present invention, the problem is overcome by providing a second "transition" update point which is far from the main update point and changing over to this second transition point (from the main transition point) upon occurrence of a "detected" changeover.

It should be noted that all cylinders could be changed over at once but it could alternatively be done by changing over one cylinder per revolution, or two cylinders per revolutions, and so forth.

Figure 10A:
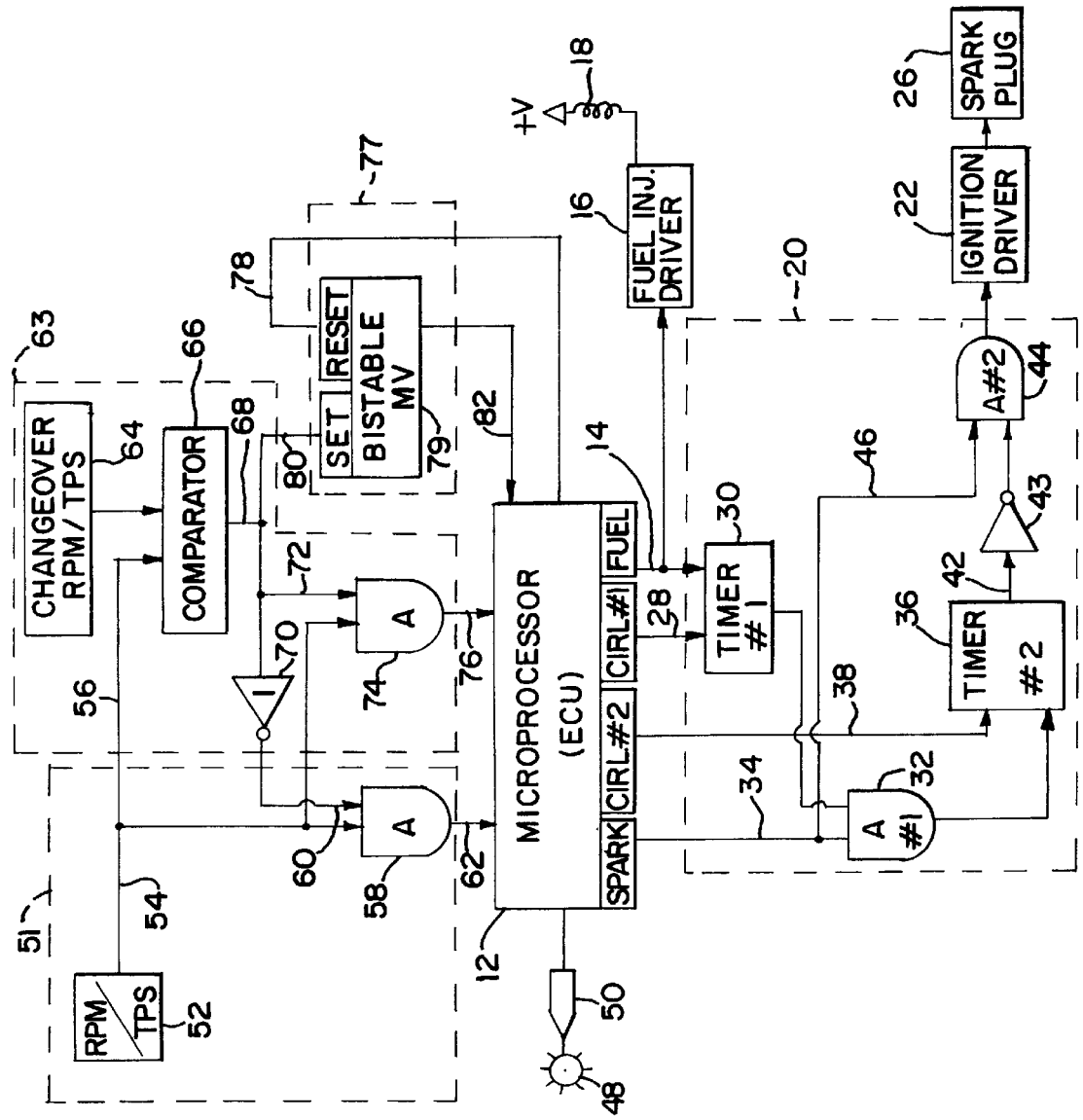
FIG. 10A is a schematic representation of a circuit diagram of the fuel injection control system of the present invention.

A schematic circuit diagram of a system 10 is illustrated in FIG. 10A that incorporates the novel features of the present invention. In FIG. 10A, a microprocessor or ECU 12 controls the fuel injection system. Microprocessor 12 generates a signal on line 14 that is coupled to the fuel injection drive circuit 16 to provide a fuel injection pulse to coil 18 of the fuel injector for each cylinder, only one of which is illustrated here.

Figure 12:
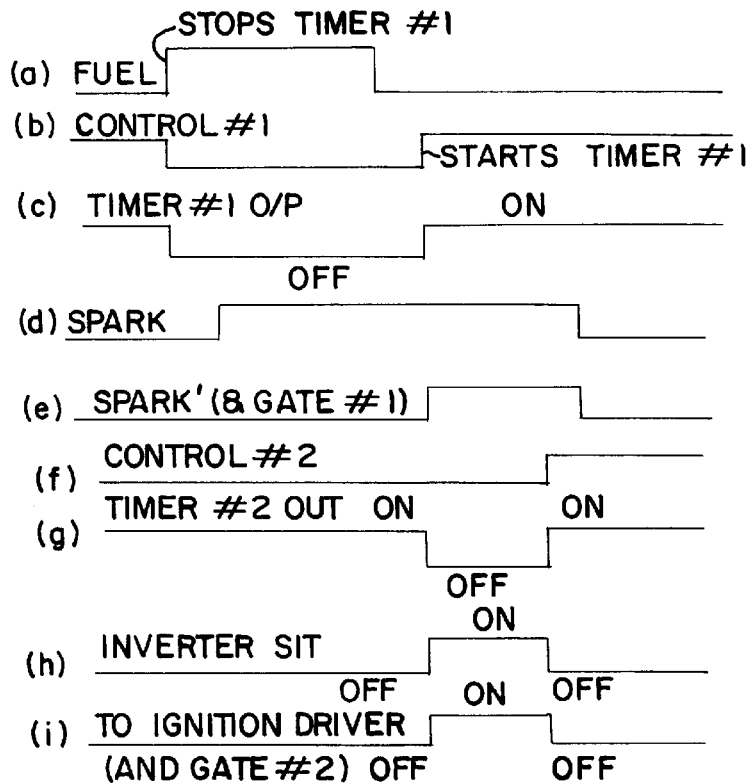
FIG. 12(a)–(i) is a graph illustrating the operation of a portion of the circuit in FIG. 10 during stratified operation of the engine.

Circuit 20 illustrates the logic for controlling the ignition at the spark plug 26. Consider first the stratified-mode-crankshaft-angle-based operation. FIG. 12 illustrates the timing of the various pulses. With appropriate inputs from microprocessor 12, circuit 20 couples a pulse to the ignition driver circuit 22 whose output is coupled to the primary of a transformer (not shown) and whose secondary is coupled to the spark device or spark plug 26. A first control signal on line 28 from microprocessor 12 is coupled to a first timer 30 along with the fuel signal on line 14. See FIGS. 12(*a*) and (*b*). The output of first timer 30 is coupled to an AND gate 32 where it is ANDED with a spark signal on line 34. See FIG. 12(*d*). The output of AND gate 32, FIG. 12(*e*), is coupled to a second timer 36 along with a timer #2 control signal on line 38. See FIG. 12(*f*). The output from AND gate 32 on line 40 is coupled to and stops the second timer 42. The second control signal on line 38, FIG. 12(*g*), turns second timer 36 ON. Thus second timer output on line 42 is low as shown in FIG. 12(*g*). Inverter 43 generates an output to AND gate 44 which, when a spark signal appears on line 46, generates the output that drives ignition driver 22. See FIGS. 12(*h*) and (*i*).

Figure 13:
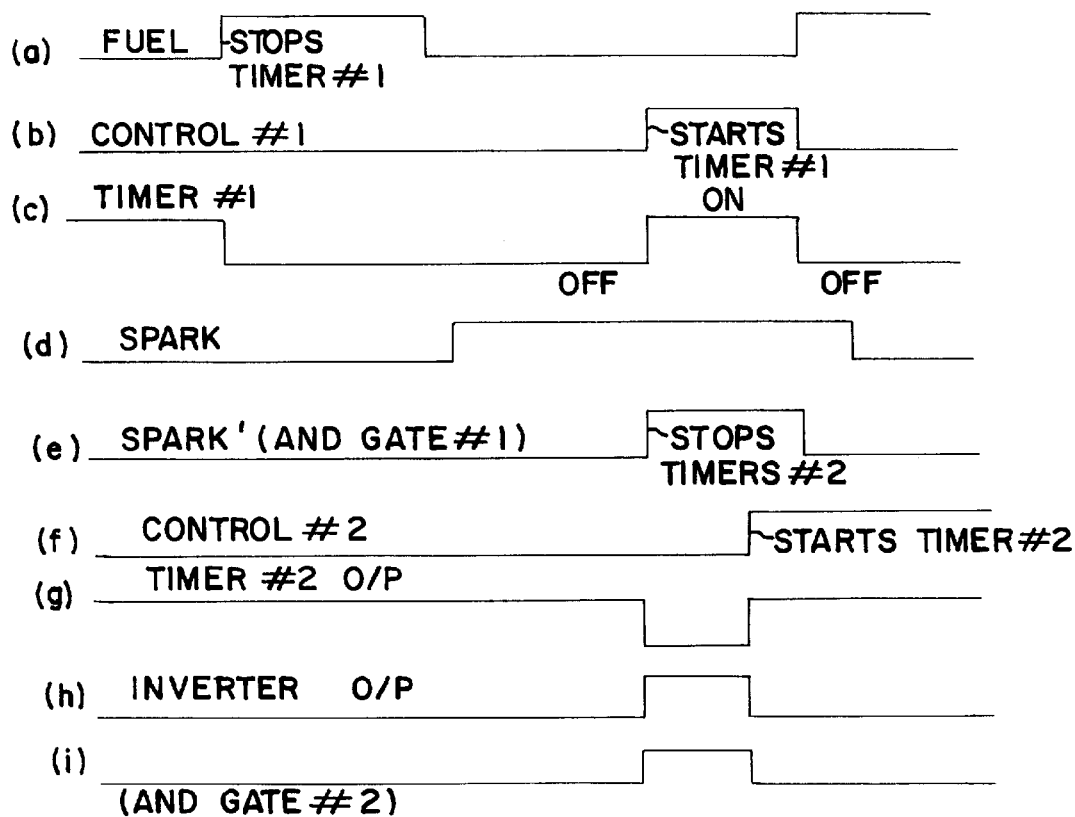
FIG. 13(a)–(i) is a timing chart illustrating the operation of the circuit in FIG. 10 during homogeneous operation of the engine.

FIG. 12 and FIG. 13 are pulse timing diagrams that illustrate the operation of circuit 20 in FIG. 10 during stratified operation and homogeneous operation, respectively. It should be noted that while hardware elements are shown in FIG. 10A, the entire control system could be operated by software programs stored in the ECU. As stated earlier, it is desirable to operate direct fuel-injected engines in a highly stratified mode during idle and low engine speeds and/or low loads (throttle position)as is well known in the art. It is desirable to change over at some speed and/or load condition to running the engine in a highly homogeneous mode, also well known in the art. As shown in FIG. 12(*a*), the microprocessor or ECU 12 provides the fuel injection pulse on line 14 as illustrated to drive the fuel-injector driver circuit 16. The first timer 30 control signal on line 28 is illustrated in FIG. 12(*b*) and the spark signal from the microprocessor is illustrated in FIG. 12(*d*). AND gate 32 in FIG. 10A combines the output of first timer 30 and the spark signal on line 34 as shown in FIG. 12(*e*). Thus, when the first timer 30 output pulse shown in FIG. 12(*c*) is high and the spark signal is high as shown in FIG. 12(*d*), the resulting pulse is shown in FIG. 12(*e*). The timer #2 control pulse as shown in FIG. 12(*f*) goes high to start the second timer 36 and the output of AND gate 32 (FIG. 12(*e*)) stops second timer 36. Thus there is no output (or a low output) from second timer 36 between the stopping and starting of second timer 36. See FIG. 12(*g*). That low signal is inverted by inverter 43 as shown in FIG. 12(*h*) and is coupled to AND gate 44 along with the spark signal on line 46 (FIG. 12(*d*)). Thus, the output of AND gate 44 is the result of the output of inverter 43 and the spark signal on line 46 creating the spark pulse shown in FIG. 12(*i*).

The microprocessor or ECU 12 knows when to generate the fuel pulse in FIG. 12(*a*), the first timer control signal shown in FIG. 12(*b*), the spark signal shown in FIG. 12(*d*), and the second timer control pulse as shown in FIG. 12(*f*) when circuit 51 in FIG. 10A (to be described hereafter) tells the microprocessor 12 that the engine is operating in idle or low engine speeds (and/or loads) below a predetermined X engine RPM (or given throttle position).

The homogeneous operation is determined by circuit 63 in FIG. 10A which tells the microprocessor 12 that the RPM of the engine is equal to or greater than the selected changeover RPM when the engine RPM is at a second speed equal to or greater than the maximum (X-RPM) predetermined low engine speed. Circuit 63 will be discussed hereafter. Further, it will be recalled that throttle position (load) could be substituted for RPM. Again, for ease of explanation, RPM is used in the examples herein.

As can be seen in FIG. 13 (*a*), a fuel pulse is again generated on line 14 to fuel injection driver circuit 16 by the microprocessor 12. Because the microprocessor 12 now knows that the engine is operating at an RPM desirable for homogeneous operation, it produces the first timer control signal on line 28 as shown in FIG. 13(*b*). The fuel signal in FIG. 13(*a*) starts the first timer 30 and the first timer control signal shown in FIG. 13(*b*) stops first timer 30 as shown in FIG. 13(*c*). It also causes a spark signal on line 34 as illustrated in FIG. 13(*d*) based on crankshaft angle as will be discussed hereafter. Thus the output of AND gate 32 in FIG. 10A, circuit 20, is a pulse illustrated in FIG. 13(e). It stops second timer 36 as shown in FIG. 13(*g*). The microprocessor then generates the second timer control signal on line 38 as shown in FIG. 13(*f*) that starts second timer 36 as shown in FIG. 13(*g*). Inverter 43 generates the pulse shown in FIG. 13(*h*). The output of AND gate 44 in FIG. 10A is coupled to ignition driver 22 and the pulse shown in FIG. 13(*i*).

Thus, as will be explained hereafter, circuit 51 in FIG. 10A is a first circuit for updating engine RPM at a first crankshaft angle determined in a well-known manner by crankshaft 48 and angle detector 50 whose signal is coupled to microprocessor 12, and causing the fuel injection into each cylinder to be the crankshaft-angle-based stratified mode during engine RPM in a first range of about idle speed to engine speeds below a predetermined X-RPM.

A second circuit 63 detects changeover and causes the fuel injection into each cylinder to be based on the homogeneous mode crankshaft angle at a second engine speed equal to (or greater than) the predetermined (X-RPM) engine speed. A third circuit 77, to be described hereafter, updates engine RPM at a second crankshaft angle closer to top-dead-center than the first crankshaft angle and causes a changeover from the stratified mode fuel injection to the homogeneous mode fuel injection when, and only when, the second engine speed is equal to (or greater than) the first range of engine speed (i.e., ≧X-RPM).

Figure 10B:
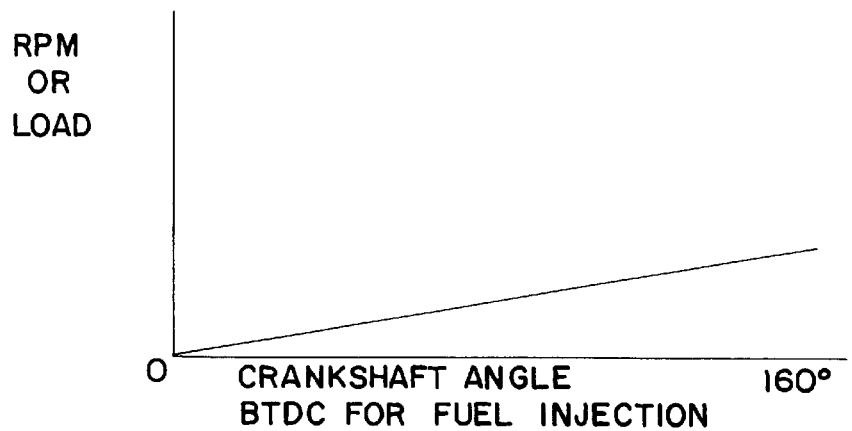
FIG. 10B is a graph illustrating the fuel injection advance with respect to engine speed or load.

As can be seen in FIG. 10A, circuit 51 includes an RPM sensor 52 (which, of course, could be a throttle position sensor—TPS) having an output coupled to AND gate 58. The RPM is sensed at a first crankshaft-angle-position as determined by microprocessor 12. The other input to AND gate 58 is an output from changeover detection circuit 63. In the example given previously, the crankshaft angle update position was set by the microprocessor 12 to be at 160° before top-dead-center but could vary depending upon the engine whose fuel injection is being controlled. Thus, the graph in FIG. 10B is intended to be an illustrative representation only of the change (stratified mode) in crankshaft angle for fuel injection with an increase in RPM and/or load. In the low RPM (and/or load) range, as speed (and/or load) increases, the point of fuel injection before top-dead-center continues to advance in terms of crankshaft angle. While the graph is shown to be linear at some angle, it could be at other angles as needed or could be non-linear as required. The output from sensor 52 on line 54 is a signal indicating actual instantaneous RPM of the engine and is detected at a crankshaft angle as determined by ECU 12. This signal is coupled through AND gate 58 to microprocessor 12 on line 62 to tell the processor to provide signals to the fuel injection driver circuit 16 and the ignition driver circuit 22 based on a varying engine operating condition such as RPM. Thus, the faster the engine RPM in a range from idle speed up to a predetermined speed of X-RPM, the more the fuel injection time is gradually varied by advancing it further and further prior to TDC.

At some selective changeover RPM, upon attainment of a sufficiently high speed (and/or load), there is a changeover from this stratified mode of fuel injection onset to the homogeneous mode fuel injection onset (as determined for a particular engine such as 40° in FIG. 7). Thus, as explained earlier, there is a significant instantaneous jump in the advance of the fuel injection event (moves further away from top-dead-center).

In FIG. 10A, circuit 63 is a second circuit for detecting changeover and causing the fuel injection into each cylinder to be based on the homogeneous mode at a second engine RPM (and/or throttle position) that is equal to (or greater than) the maximum RPM of the first range of engine RPMs (and/or range of throttle positions). The changeover RPM is set in memory 64, which may be a part of microprocessor 12 if desired. The value of the changeover RPM 64 is continuously compared with the instantaneous RPM from sensor 52 at a set crankshaft angle update position (i.e., 160° BTDC). Comparator 66 compares the two RPM's and when the instantaneous RPM as determined by sensor 52 is less than the stored changeover RPM, no signal is generated from comparator 66 on line 68 and thus inverter 70 produces an output on line 60 to enable AND gate 58 to produce a signal on line 62 telling the microprocessor the actual instantaneous RPM at the given crankshaft angle RPM update position so that the microprocessor can determine the fuel injection point for the detected RPM.

However, when comparator 66 finds that the stored changeover RPM 64 is less than the instantaneous RPM at the given crankshaft angle update position, an output is generated on line 68 causing inverter 70 to produce no output on line 60, thus disabling AND gate 58 and telling the computer to stop using stratified mode control. The output of comparator 66 is also coupled on line 72 to AND gate 74 that, along with the signal from sensor 52, produces an output on line 76 to tell the computer 12 to use the fixed crankshaft angle fuel injection control at the new RPM update angle set by the comparator 66 signal on line 80 to a device such as bi-stable multivibrator 79. Thus comparator 66 generates an output on line 68, 80 to any well-known circuit such as bi-stable multivibrator 79 in third circuit 77 to generate an output on line 82 that causes microprocessor 12 to change the crankshaft angle RPM update position to a new position such as the 40° before top-dead-center as describer earlier. After one or two revolutions of the crankshaft (as desired), if the microprocessor 12 continues have a signal on line 76 from AND gate 74, it generates an output on line 78 to reset the bi-stable multivibrator 79 in third circuit 77 to cause the microprocessor 12 to set the crankshaft angle RPM update position so as to again resume the standard update position at 160° BTDC.

As long as the instantaneous engine RPM as determined by detector 52 is greater than the changeover RPM determined by storage device 64, there will be an output on line 76 from AND gate 74 to the microprocessor 12 to tell it to continue to use the crankshaft update position as done previously before the changeover.

As stated previously, crankshaft angle RPM update position is preferably determined by an internal portion of microprocessor 12 such that a signal on line 82 will cause the microprocessor 12 to change the crankshaft angle RPM update position to the new update position as set in the microprocessor and when the signal is removed on line 82 by resetting bi-stable multivibrator 79, the microprocessor 12 knows to resume the former crankshaft angle RPM update position. Thus the system remains using the homogeneous mode of operation until such time as the instantaneous RPM as detected by sensor 52 is less than the changeover RPM determined by unit 64. At that time, AND gate 58 is once again enabled, AND gate 74 is disabled, and the microprocessor 12, receiving the signal on line 62, knows that stratified mode of operation is to be used once again.

Figure 11:
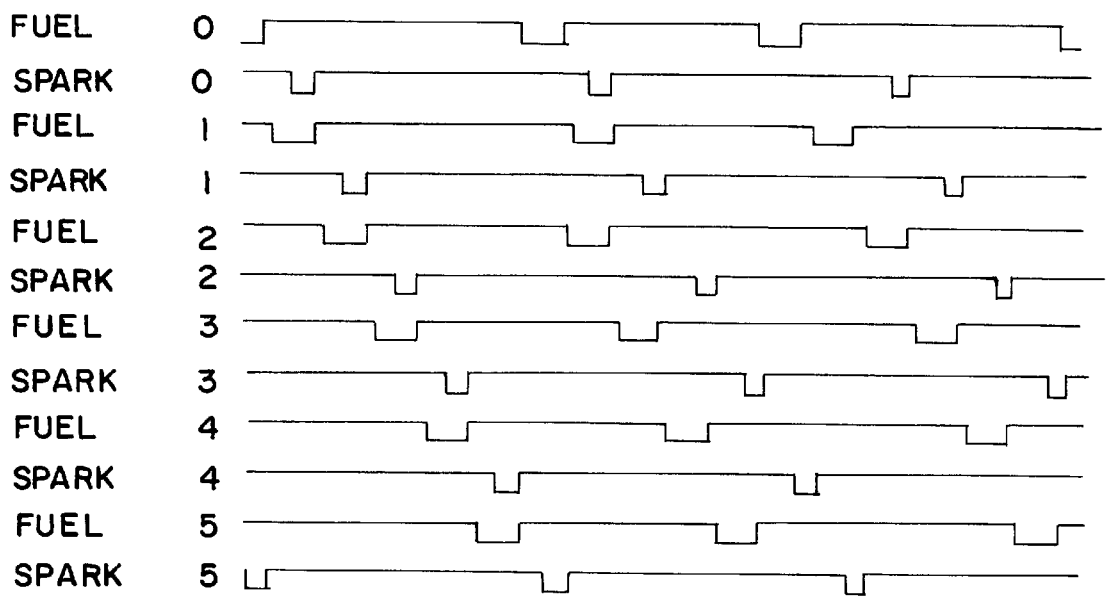
FIG. 11 is a timing chart for a six-cylinder engine illustrating the fuel and spark pulses to each cylinder and how they are adjusted when there is a significant instantaneous jump in the speed and/or load of the engine.

FIG. 11 is a waveform diagram of the fuel and spark pulses applied to each of six cylinders and illustrating the change from a stratified operation to a homogeneous operation. Note the first spark to each of the six cylinders (0–5) occurs at a predetermined time after the end of the fuel injection pulse. The same applies for the second spark pulse for both the first and second cylinders. However, on the third cylinder, upon receiving the signal on line 76 from second circuit 63, the microprocessor 12 causes the fuel to be injected into the cylinder a much greater length of time before the spark signal occurs. FIG. 11 illustrates that for each cylinder thereafter the engine is operating in the homogeneous mode and the fuel is injected much earlier before top-dead-center than previously and, thus, the spark occurs much later than "normal" with respect to the time of fuel injection.

Thus it can be seen that the fuel injection control system described herein comprises a first circuit 51 for updating engine RPM at a first crankshaft angle determined by microprocessor 12 with a signal from sensor 50 that is monitoring the crankshaft angle of the crankshaft 48. Circuit 51 causes the stratified mode of fuel injection into each cylinder to be variable in time (BTDC—as is well known in the prior art) during engine RPM in a first range of about idle speed to engine speeds equal to (or below) some predetermined value of X-RPM.

The second circuit 63 provides a signal to microprocessor 12 on line 76 for causing the homogeneous mode of fuel injection into each cylinder at a second engine speed that is equal to or greater than the predetermined (X-RPM) engine speed.

The third circuit 77 causes microprocessor 12 to update the engine RPM at a second crankshaft angle closer to TDC than the first crankshaft angle and causes a changeover from the stratified mode of fuel injection to the homogeneous mode of injection when, and only when, the second engine speed is equal to (or greater than) the maximum X-RPM of the first range of engine speed.

While the first circuit 51, second circuit 63, and third circuit 77 are all shown coupled to microprocessor 12, it is obvious that various components of each of those circuits could be a part of microprocessor 12 and thus at least a portion, or all, of each of those circuits can belong to microprocessor 12. The control system could also be operated by software programs in the microprocessor 12.

Thus the fuel-injection control system includes at least one fuel-injector circuit 16 coupled to the microprocessor 12 for receiving stratified mode control signals and causing the fuel to be injected into the cylinders at varying times BTDC proportional to the engine RPM in a first RPM range. The microprocessor 12 updates the engine RPM at a first crankshaft angle during the first engine RPM range and an ignition circuit 22 is coupled to the microprocessor 12 for causing the time-varying ignition after injection of the fuel, the fuel injection stratified mode being gradually advanced by the microprocessor 12 with respect to top-dead-center as the engine speed increases in the first engine RPM range.

The first circuit 51 of the fuel-injection control system 10 comprises sensor 52 for sensing instantaneous engine RPM (and/or load based on throttle position) and microprocessor 12 holding a crankshaft angle at which instantaneous engine RPM is updated by sampling the instantaneous engine RPM from sensor 52 that provides a signal to cause the microprocessor 12 to use the stratified mode of fuel injection.

The second circuit 63 of the fuel injection control system includes a changeover RPM storage device 64 coupled to the instantaneous engine RPM sensor 52 for causing engine RPM to be updated by the microprocessor 12 at a second crankshaft angle closer to top-dead-center than the first crankshaft angle during at least one revolution of the crankshaft when, and only when, the instantaneous engine RPM is equal to (or greater than) the first engine RPM range (as indicated by the changeover RPM stored in the microprocessor 12) thereby causing the microprocessor 12 to generate a signal that controls the timing of the fuel injection in accordance with the homogeneous mode.

The second circuit further comprises a comparator 66 for comparing the instantaneous engine RPM from sensor 52 with the changeover RPM from storage device 64 and a logic circuit, including inverter 70, AND gate 58, and AND gate 74, is coupled between the comparator 66 and the microprocessor 12 for disabling the first circuit 51 by disabling AND gate 58 through line 60 and enabling the second circuit 63 to change the fuel injection control from the stratified mode to the homogeneous mode by providing a signal on line 76 to microprocessor 12.

The third circuit 77 comprises a signal-generating device such as bi-stable multivibrator 79 that provides a new update position of the crankshaft angle to microprocessor 12. It is set by a signal on line 80 from comparator 66 to provide the new signal to microprocessor 12 and, at the proper time, one or two revolutions later, microprocessor 12 provides a reset signal on line 78 which causes a signal on line 82 to reestablish the original crankshaft angle RPM update position.

It will be understood that while a bi-stable multivibrator 79 is shown forming third circuit 77, the representation is for explanatory purposes only and the bi-stable multivibrator 79 could be a part of microprocessor 12 that stores the standard and transient update angles and provides the proper signal at the proper time.

Thus, the sensor 52, when sampled by the crankshaft angle RPM update signal stored in microprocessor 12, represents a sampling means (associated with the microprocessor 12) to sample engine speed at a first crankshaft position prior to top-dead-center for each cylinder. The AND gate 58 represents a gate means coupled between the microprocessor 12 and the sampling means 52 for causing fuel injection into each cylinder to be in the stratified mode with respect to the sampled RPM such that the microprocessor 12 causes fuel injection in each cylinder to occur at an increasingly earlier crankshaft position (advance) with respect to top-dead-center as the engine RPM increases. The device 64 in second circuit 63 may be a storage device forming part of microprocessor 12 and stores a changeover RPM at which the fuel injection into each cylinder is determined a second crankshaft angle closer to TDC and causes the fuel ignition to be based on the homogeneous mode when, and only when, the sampled instantaneous RPM is equal to or greater than the stored changeover RPM. As stated earlier, the bi-stable device 79 in third circuit 77 is used for changing crankshaft angle at which the RPM is sampled and is coupled to the microprocessor 12 for causing the engine speed to be sampled at the second crankshaft angle closer to top-dead-center than the first crankshaft angle for each cylinder only when actual instantaneous RPM is equal to (or greater than) the stored changeover RPM to cause the fuel injection into each cylinder to take place at a fixed crankshaft position with respect to top-dead-center thus causing the changeover from the stratified mode of fuel injection to the homogeneous mode of fuel injection.

Thus there has been disclosed a novel update strategy for a fuel-injection control system for an internal combustion engine in which at an engine speed including idle to a predetermined fixed RPM, the engine operates on a stratified mode fuel-injection onset and above that speed operates on a homogeneous mode of fuel-injection onset. The novel strategy of the present invention causes the engine RPM sampling that normally takes place at a standard update point to a predetermined "provisional" update point which is far from the standard update point, for one or two revolutions, after which the update point then reverts back to the "standard" update point.

The corresponding structures, materials, acts, and equivalents of all means or step plus function elements in the claims below are intended to include any structure, material, or act for performing the function in combination with other claimed elements as specifically claimed.

I claim:

1. A fuel-injection control system for an internal combustion engine having a crankshaft, a plurality of spark plugs, each for an engine cylinder, a fuel injector for injecting fuel in each of said cylinders, a microprocessor, and a crankshaft angle position detector coupled to the microprocessor, the control system comprising:

a first circuit for updating an engine operating parameter at a first crankshaft angle and causing the fuel injection into each cylinder to be in a stratified mode during a first engine operating parameter range;

a second circuit for causing the fuel injection into each cylinder to be based in a homogeneous mode during a second engine operating parameter range that is greater than the first engine operating parameter range; and a third circuit for updating engine RPM at a second crankshaft angle closer to top-dead-center than the first crankshaft angle and for causing a changeover from the stratified mode of fuel injection to the homogeneous mode of fuel injection when, and only when, the second engine operating parameter range is greater than the first engine operating parameter range.

2. The fuel injection control system of claim 1 wherein:

the engine operating parameter is RPM;

the first engine operating parameter range is from about idle speed RPM to a predetermined RPM; and the second engine operating parameter range is an RPM greater than the predetermined RPM.

3. The fuel injection control system as in claim 2 further comprising:

at least one fuel-injector circuit coupled to the microprocessor for receiving stratified mode fuel-injection control signals for causing the fuel to be injected into the cylinder at varying crankshaft angles proportional to the engine RPM in the first engine operating RPM range;

said microprocessor updating engine RPM at a first crankshaft angle during the first engine operating RPM range; and an ignition circuit coupled to the microprocessor for causing ignition after injection of the fuel based on said varying crankshaft angles, the fuel injection being gradually advanced with respect to top-dead-center as the engine speed increases in the first engine RPM range.

4. The fuel injection control system as in claim 3 wherein the first control circuit comprises:

a sensor for sensing instantaneous engine RPM; and a storage device for holding a crankshaft angle at which instantaneous engine RPM is to be sensed and updated.

5. The fuel injection control system as in claim 4 wherein the second circuit comprises:

a changeover RPM storage device coupled to the instantaneous engine RPM sensor and the microprocessor for causing engine RPM to be updated by microprocessor at said second crankshaft angle closer to top-dead-center than the first crankshaft angle during at least one revolution of the crankshaft when, and only when, the sensed instantaneous engine RPM is greater than the first engine RPM range thereby causing the microprocessor to generate a fixed crankshaft angle signal that controls the timing of fuel injection.

6. The fuel injection control system of claim 5 wherein the second circuit further comprises:

a comparator for comparing the instantaneous engine RPM with the changeover RPM; and logic circuit means coupled between the comparator and the microprocessor for disabling the first circuit and enabling the second circuit to change the fuel injection control from the stratified mode to the homogeneous mode.

7. The fuel injection control system of claim 6 wherein said third circuit comprises a control signal device coupled between the microprocessor and the comparator for causing the crankshaft angle RPM update to change from a first update point to a predetermined second update point that is different from the first update point, for at least one revolution, after which the update point then reverts back to the first update point.

8. The fuel injection control circuit of claim 1 wherein:

the engine operating parameter is throttle position representing engine load;

the first engine operating parameter range is from a throttle position representing a substantially increasing engine load to a throttle position representing a maximum predetermined engine load; and the second engine operating parameter range is a throttle position representing an engine load that is greater than said maximum predetermined engine load of said first engine operating parameter range.

9. A fuel injection control system for an internal combustion engine having a plurality of cylinders, a rotating crankshaft with a top-dead-center position with respect to each cylinder, a microprocessor, a spark plug for each engine cylinder, a throttle that can be advanced from a minimum position to a maximum position, and a fuel injector for injecting fuel into each of the cylinders, the control system comprising:

a sensor for generating a signal representing actual instantaneous throttle position;

sampling means associated with the sensor for sampling said instantaneous throttle position at a first crankshaft angle prior to top-dead-center for each cylinder;

gating means coupled between said microprocessor and said sensor for causing fuel injection into each cylinder to be in a stratified mode with respect to the sampled throttle position such that the microprocessor causes fuel injection in each cylinder to occur at an increasingly earlier crankshaft angle with respect to top-dead-center as throttle position advances from the minimum position;

a storage device for storing a changeover throttle position at which the fuel injection into each cylinder is to be in a homogeneous mode if the sampled instantaneous throttle position is equal to or greater than the stored changeover throttle position; and a device coupled to said microprocessor and said storage device for changing said first crankshaft angle for sampling said throttle position to a second crankshaft angle closer to top-dead-center than said first crankshaft angle for each cylinder when, and only when, actual instantaneous throttle position is equal to or greater than the stored changeover throttle position to cause fuel injection into each cylinder to take place in the homogeneous mode thus causing a changeover from said stratified method of fuel injection to said homogeneous mode of fuel injection.

10. A system for determining the proper fuel injection timing for an internal combustion engine having a plurality of cylinders, a rotating crankshaft with a top-dead-center point for each cylinder, a spark plug for each cylinder, and a fuel injector for each cylinder, the system comprising:

a stratified mode fuel-injection system for providing a signal causing stratified fuel injection in each cylinder to occur at a variable time before top-dead-center of said crankshaft for each cylinder;

a computer coupled to said stratified mode fuel-injection system for causing fuel injection in each cylinder to occur at a crankshaft angle before top-dead-center of said crankshaft for each cylinder that varies according to engine speed in the range from about idle speed to a predetermined RPM;

a memory device for storing a predetermined RPM changeover below which fuel injection occurs in the stratified mode and above which point fuel injection occurs according to a homogeneous mode; and an engine RPM sensor in the stratified mode of fuel injection system coupled to the memory device for updating engine RPM at a first crankshaft angle prior to top-dead-center for each cylinder in the stratified mode fuel-injection system when actual RPM is less than the changeover RPM and updating engine RPM at a second crankshaft angle closer to top-dead-center than said first crankshaft angle position when actual RPM is equal to or greater than the changeover RPM.

11. A fuel-injection system for an internal combustion engine having a plurality of cylinders, a crankshaft rotatable at varying RPM and a fuel injector in each cylinder, the fuel injection system comprising:

a first circuit for causing stratified fuel to be injected into each cylinder at a time proportional to engine RPM when engine RPM is in a first range of about idle RPM to less than X-RPM;

circuit means coupled to said first circuit for updating engine RPM at a first crankshaft angle position during said first RPM range; and a changeover RPM sensor coupled to the circuit means and the first circuit for updating engine RPM at a second crankshaft angle position closer to top-dead-center than said first crankshaft angle position during at least one revolution of said crankshaft when, and only when, said engine RPM is equal to or greater than X-RPM and causing fuel to be injected into each cylinder in the homogeneous mode.

12. A method of providing fuel injection to an internal combustion engine comprising the steps of:

detecting the engine instantaneous RPM; and causing a changeover from a stratified mode of fuel injection used in a first engine RPM range and based on a first RPM sampling crankshaft angle position to a homogeneous mode of fuel injection that is based on a second RPM sampling crankshaft angle position closer to TDC than said first RPM sampling crankshaft angle position when, and only when, there is a change in engine RPM such that a second engine RPM exceeds the first engine RPM range in which the stratified mode of fuel injection occurs.

* * * * *